United States Patent
Knab et al.

[11] 3,923,482
[45] Dec. 2, 1975

[54] CLEAN AIR DIRECTING APPARATUS

[75] Inventors: James V. Knab, Grand Rapids; Charles Haeckler, Cannonsburg; John Bell; Jerry Fellinger, both of Grand Rapids, all of Mich.

[73] Assignee: James V. Knab, Grand Rapids, Mich.

[22] Filed: Apr. 12, 1972

[21] Appl. No.: 243,308

[52] U.S. Cl. .................. 55/412; 55/467; 55/473; 55/DIG. 18; 55/DIG. 29; 98/36; 128/132; 128/184; 240/1.4; 261/26; 261/DIG. 34
[51] Int. Cl.² .................. F24F 9/00; F24F 13/08
[58] Field of Search ........ 55/413, 97, 418, 356, 385, 55/414, 467, 471, 472, DIG. 29, DIG. 36, DIG. 18, 412; 98/1, 36, 11 SR, 40 B, 33 R, 33 A; 128/1 R, 132, 184; 21/74 R; 236/44 C, 49, 44 E; 240/1.4; 34/50

[56] References Cited
UNITED STATES PATENTS

| | | | |
|---|---|---|---|
| 2,210,589 | 8/1940 | Kurth | 98/40 B |
| 2,377,426 | 6/1945 | Kersten | 236/44 E |
| 2,798,938 | 7/1957 | Jewell | 240/1.4 |
| 3,511,162 | 5/1970 | Truhan | 98/36 |
| 3,820,536 | 6/1974 | Anspach, Jr. et al. | 55/DIG. 29 X |

Primary Examiner—Frank W. Lutter
Assistant Examiner—Neil F. Greenblum
Attorney, Agent, or Firm—Wolfe, Hubbard, Leydig, Voit & Osann, Ltd.

[57] ABSTRACT

A selectively positionable surgical clean air directing apparatus adapted to emit a column of bacteria-free air which may be readily directed upon any desired operating area to effectively isolate that area from contaminants during surgical operations or the like. The apparatus discharges a central column of low velocity laminar flow air surrounded by a relatively high velocity sheath or curtain of contaminant-free air which prevents contaminants from entering the central air column. The apparatus includes a humidification system for providing the air with a predetermined moisture content, and control means for automatically controlling and maintaining the humidity and velocity of the discharged air column at selected values. The discharge head of the apparatus in one embodiment includes an integral surgical lighting system so that light and clean air may be focused simultaneously onto an operating area.

13 Claims, 9 Drawing Figures

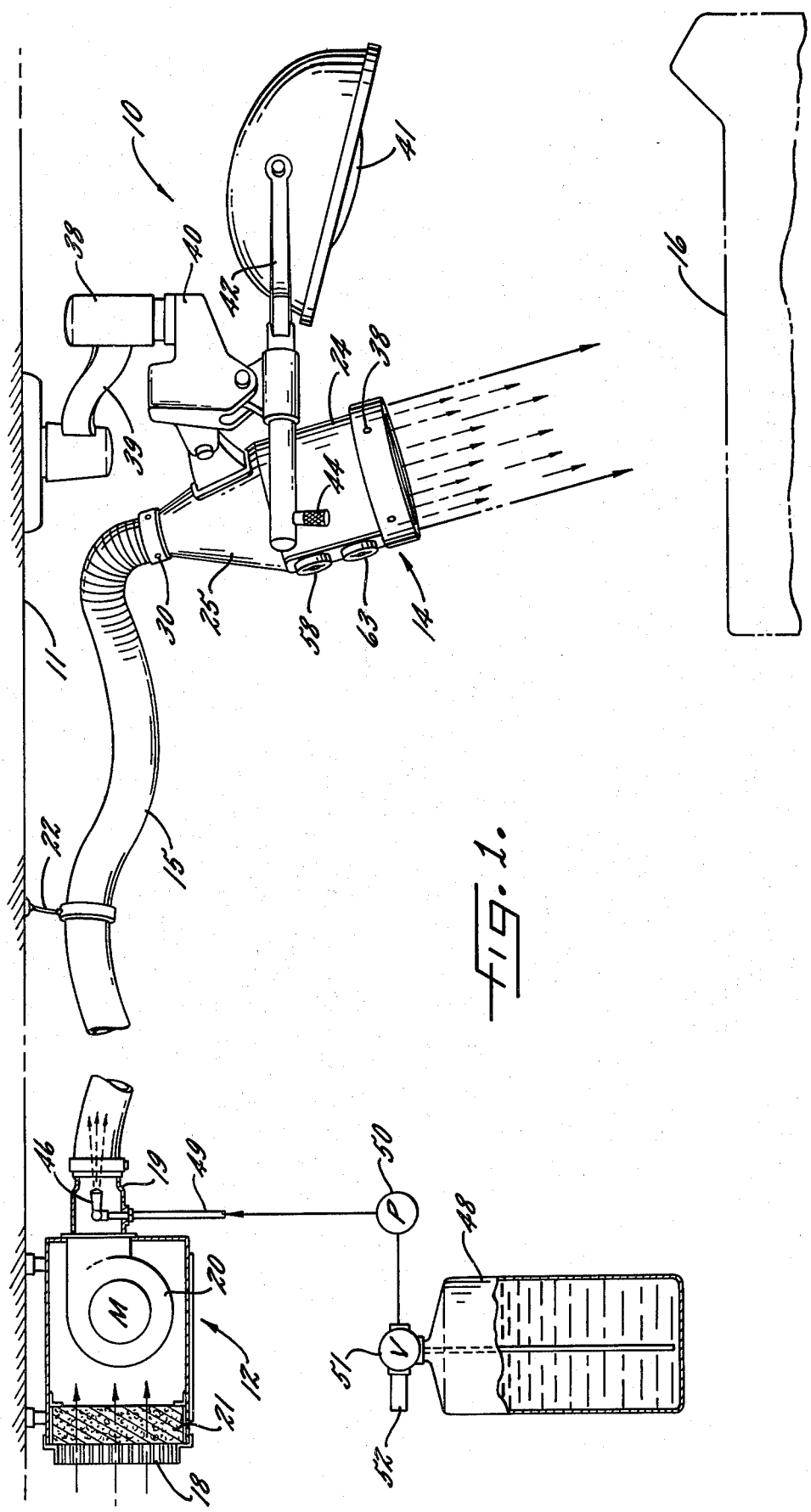

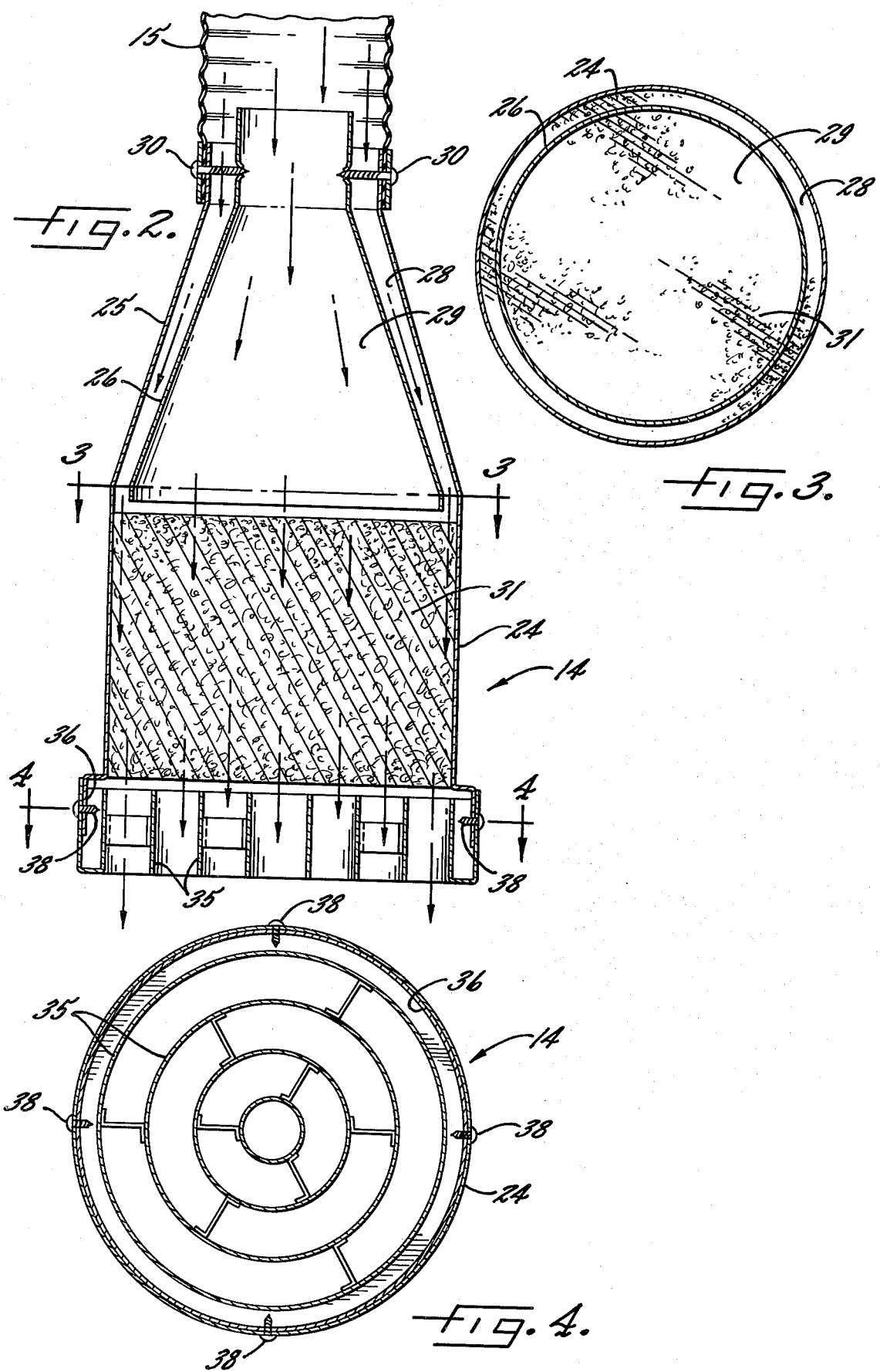

CLEAN AIR DIRECTING APPARATUS

DESCRIPTION OF THE INVENTION

The present invention relates generally to apparatus for controlling the environment in a localized area, and more particularly, to a selectively positionable apparatus which directs a column of bacteria-free air to a desired operating area to isolate that area from contaminants.

Air in hospitals or like institutions is known to often be heavily contaminated with various types of bacteria, and during many surgical operations there is a need to eliminate all bacteria contaminant producing or bearing particles in the air in the vicinity of a patient operating zone. This is particularly true during surgery involving organ transplants or artificial implant devices since infections incurred from such operations can be critical. Present systems of combating airborne contaminants all have had certain drawbacks. In clean room systems or entire patient enclosures there generally is no means for selectively directing air to a given location. As a result, the surgical team around the operating table often blocks the flow of air, which imparts a turbulent effect to the air flow and introduces human-borne contaminants into the patient area. Moreover, such entire room or patient enclosure systems have been complex and expensive and frequently require considerable space around the periphery of the room or enclosure for installation of relatively large air handling and conditioning equipment. On the other hand, smaller modular blower units which heretofore have been employed for supplying clean air to a patient zone have not been effective in maintaining a bacteria-free environment at the operating area.

In addition, existing surgical clean air systems generally cannot be readily controlled to adjust the flow of air to the existing conditions. Filter contamination and other restrictions at the air intake and exhaust ports, or surges in electrical power, also can vary the rate of air flow from such systems. During operations of considerable duration, such as implant surgery which may last 3 to 5 hours, measurable changes in the flow rate can result from such interruptions. Another undesirable effect of the use of present clean air systems over prolonged periods is that the air tends to dry the wound during the operation.

Accordingly, it is an object of the present invention to provide a relatively small and selectively positionable clean air apparatus adapted to emit a column of bacteria-free air which may be readily directed upon any desired operating area to effectively isolate that area from contaminants during surgical operations or the like.

Another object is to provide surgical air direction apparatus as characterized above which provides a high velocity bacteria-free annular air sheath about a central column of low velocity bacteria-free air so as to more effectively prevent contaminants from entering the central air column.

A further object is to provide surgical air direction apparatus of the above kind which includes a humidification system capable of providing the air with a predetermined moisture content.

Still another object is to provide surgical air direction apparatus of the foregoing type which includes means for automatically controlling and maintaining the humidity and velocity of the air at desired values.

Yet another object is to provide a surgical air unit of the above type which includes an integral surgical lighting system so that the light and clean air may be focused simultaneously onto an operating zone.

Other objects and advantages of the invention will become apparent upon reading the following detailed description and upon reference to the drawings in which:

FIG. 1 is a partially diagrammatic elevational view of a surgical air directing apparatus embodying the present invention installed in an operating room;

FIG. 2 is an enlarged longitudinal section taken through the air directing head of the apparatus shown in FIG. 1;

Figure 5:
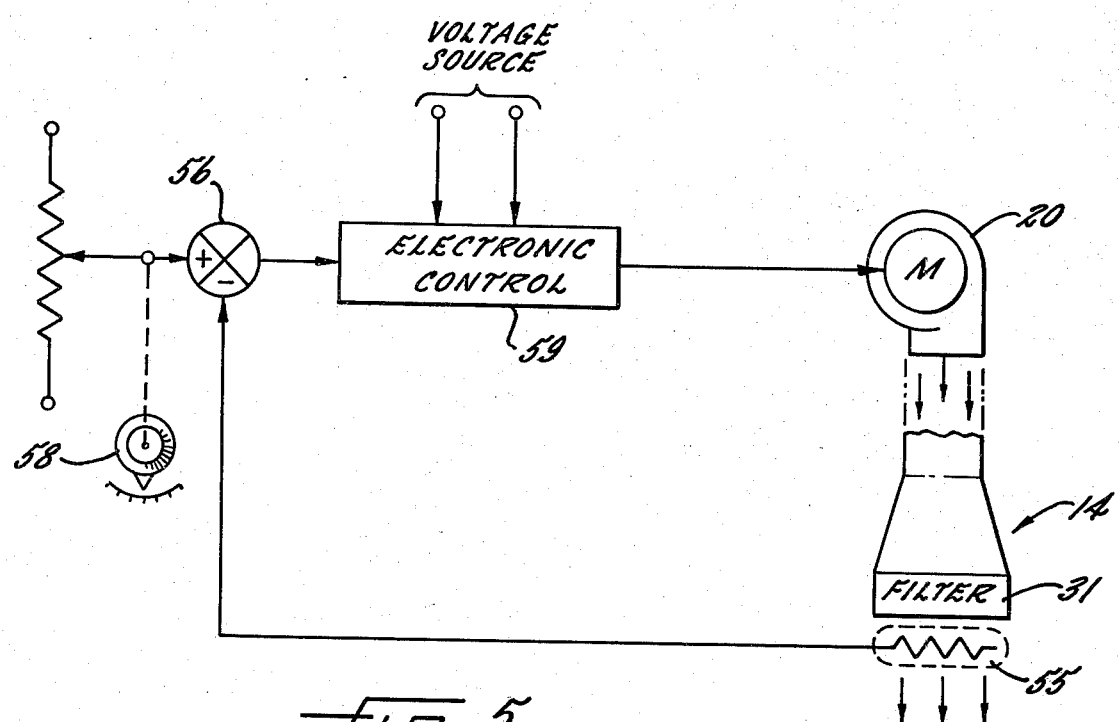
Figure 6:
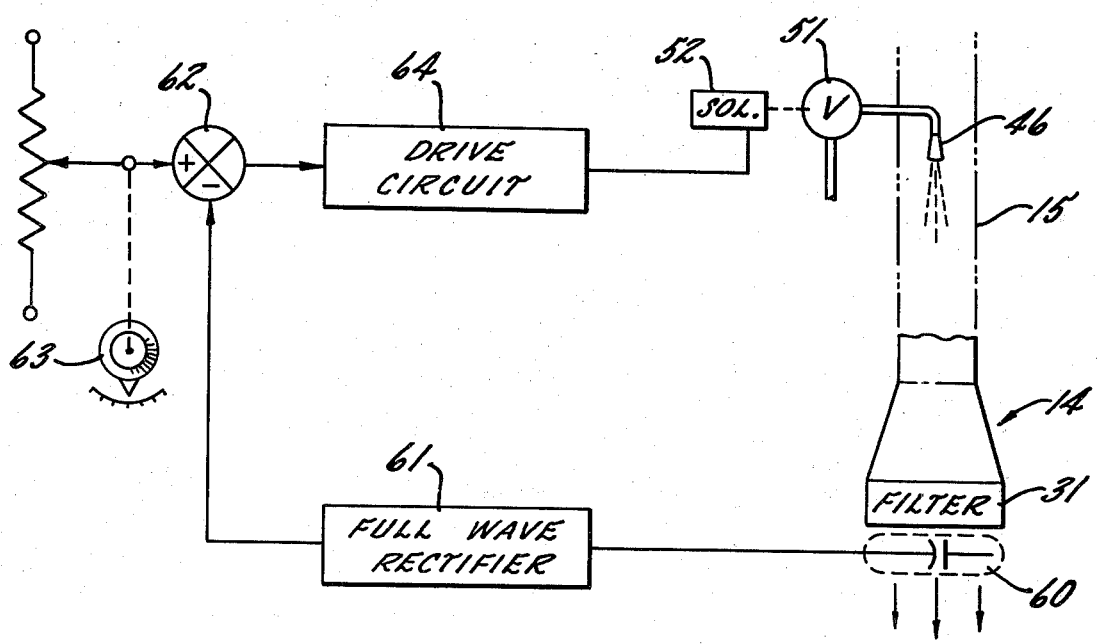
Figure 7:
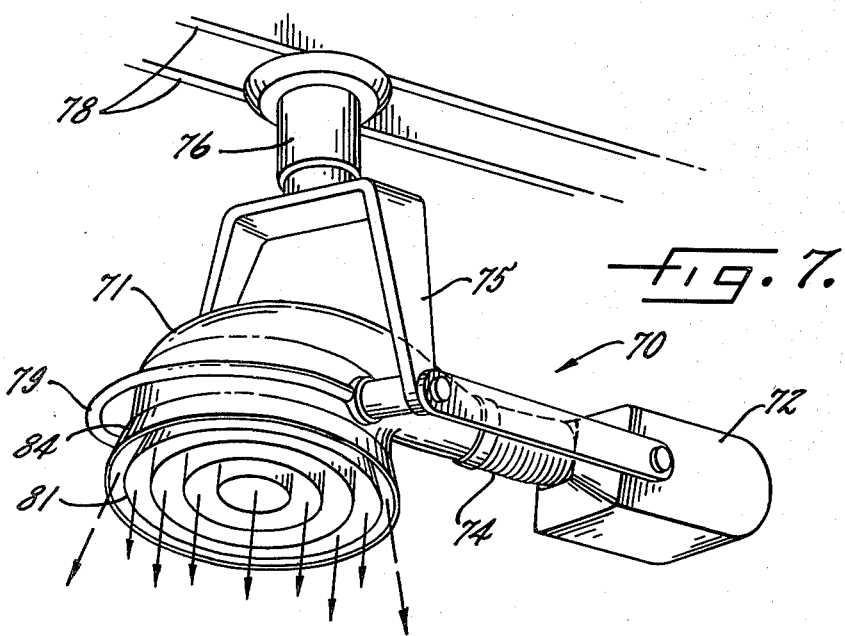
Figure 8:
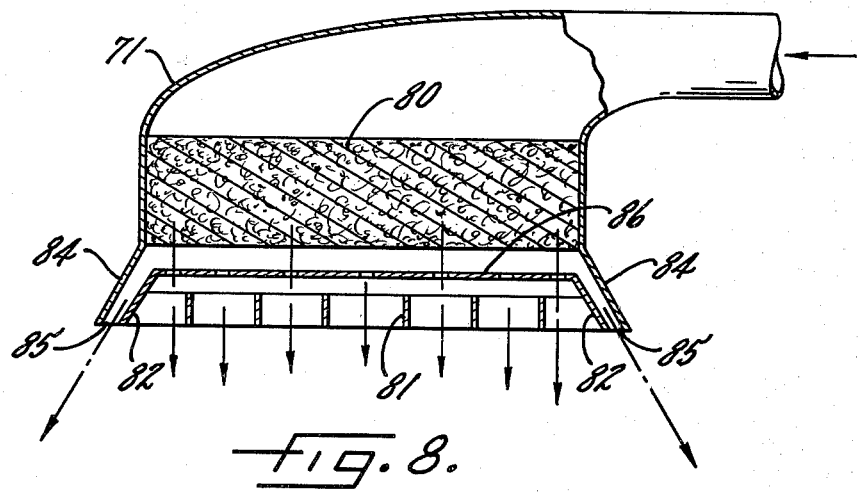
Figure 9:
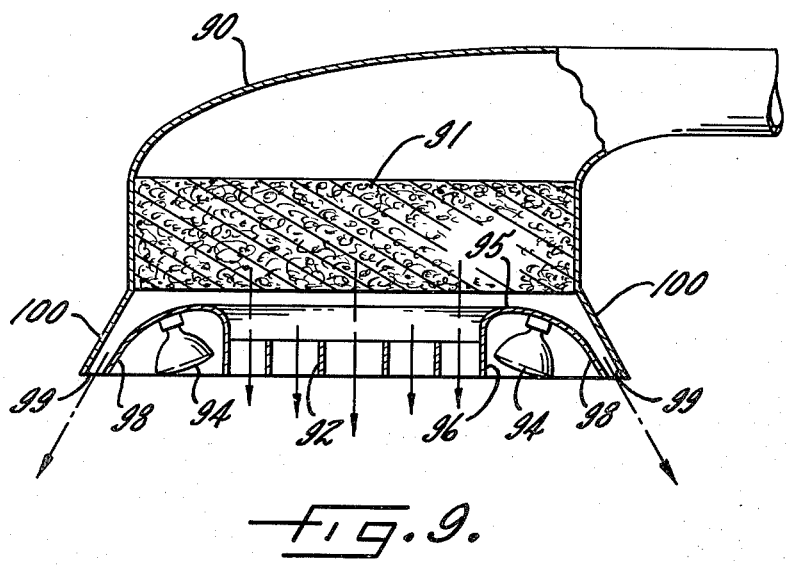

FIGS. 3 and 4 are transverse sections taken in the planes of lines 3—3 and 4—4, respectively, in FIG. 2;

FIG. 5 is a circuit diagram of the air velocity control system for the apparatus shown in FIG. 1;

FIG. 6 is a circuit diagram of the humidity control system for the apparatus shown in FIG. 1;

FIG. 7 is a perspective view of another embodiment of a clean air directing apparatus embodying the present invention;

FIG. 8 is an enlarged fragmentary section of the air directing head of the apparatus shown in FIG. 7; and FIG. 9 is a fragmentary section of still another embodiment of an air direction head for use in this system shown in FIG. 7.

While the invention is susceptible of various modifications and alternative constructions, certain illustrative embodiments thereof have been shown in the drawings and will be described below in detail. It should be understood, however, that there is no intention to limit the invention to the specific forms disclosed, but, on the contrary, the intention is to cover all modifications, alternative constructions, and equivalents falling within the spirit and scope of the invention.

Turning now to FIG. 1 of the drawings, there is shown an illustrative surgical clean air directing apparatus 10 embodying the invention suspended from a ceiling 11 of an operating room. The apparatus 10 includes a blower unit 12, an air directing head or gun module 14, and an air delivery tube 15 interconnecting the blower unit 12 and the head 14. The apparatus operates by taking air in the blower unit 12, forcibly directing the air into the delivery tube 15, and discharging it from the head 14 in a laminar flow. The head 14 may be selectively positioned so that air from the head is directed to any desired operating area upon a table 16 below.

The blower unit 12 in this case is rigidly secured to the ceiling 11 of the operating room at a point removed from the operating table 16 and has an inlet port 18 on one side and a discharge duct 19 at the other side. An electric motor powered fan 20 mounted within the blower unit 12 serves to draw air in the inlet port 18 and forcefully direct it out the discharge duct 19 to which the air delivery tube 15 is connected. To initially filter the air as it is pulled into the blower unit from the inlet port 18, a preliminary filter 21 is disposed within the blower unit immediately adjacent the inlet port. The air delivery tube 15 extending from the blower unit 12 is attached at one or more points to the ceiling by hooks 22 so as not to interfere with the surgical team working below.

In accordance with one aspect of the invention, the head 14 is adapted to emit a laminar flow central column of contaminant-free air surrounded by an annular sheath or curtain of relatively high velocity contaminant-free air which prevents contaminants from entering into the central column. To this end, in the illustrated embodiment the head 14 has a housing 24 formed with a frustoconical section 25 at its upstream end. A frustoconical-shaped damper member 26 is mounted coaxially within the frustoconical housing section 25 so as to define an annular outer air passageway 28 between the damper 26 and the housing section 25 and a central passageway 29 axially through the damper member 26. Circumferentially spaced screws 30 maintain the upstream end of the damper member 26 in coaxial spaced relation with the housing 25, and similar screws (not shown) support the downstream end of the damper member. The damper member 26 has frustoconical sides which taper outwardly in a downstream direction to a greater degree than do the sides of the frustoconical housing section 25 so that the area of the outer annular passageway 28 at the upstream end of the damper member 26 is greater than the area of passageway 28 at the downstream end. The damper member 26 thereby tends to compress and nozzle air flowing through the outer passageway 28 so that its velocity increases as it passes between the downstream end of the damper and the housing. On the other hand, since the area of the central passageway 29 defined by the outwardly tapered damper 26 is smaller at the upstream end than at the downstream end of the damper, air passing through the central passageway expands and is reduced in velocity. Thus, the air passing centrally through the damper member 26 forms a column of relatively low velocity air while the air traveling through the outer passageway 28 forms an annular air curtain of relatively high velocity.

In keeping with the invention, the head 14 has a high efficiency particle air filter 31 downstream of the damper member 26 so that both the central column of low velocity air and the outer sheath of high velocity air pass through the filter and are substantially contaminant free as they are discharged from the head. The filter 31 may be of the type commonly referred to as HEPA (high efficiency particle air) filter, which is commercially available and is capable of screening out 99.97% of all airborne particles of 0.3 micron and larger in size. The filter 31 is shown spaced a small distance downstream from the damper member 26 and occupies the entire cross sectional area of the housing. It will be appreciated that since the filter 31 is located at the approximate terminal point in the air delivery system, it is assured that air discharged from the head is free of any contaminants that may accumulate upstream in the system. The filter also tends to effect a laminar flow of the air as it travels through the filter and out the head.

To improve the laminar flow of the air as it leaves the head 14, an air straightening grid 35 is secured to the head directly downstream of the filter 31. This illustrated grid comprises a plurality of interconnected coaxial cylinders of various diameters that guide and straighten the air as it is emitted from the head. The air straightening grid 35 is secured to outwardly extending flanges 36 of the housing 24 by screws 38.

In order that the head 14 may be easily and selectively positioned to direct air to any desired operating area on the table 16, the head 14 is suspended from the ceiling by a universal bracket 38. The bracket 38 includes two relatively rotatable arm members 39, 40 that permit horizontal positioning of the head, and the head is rotatably connected to the arm member 40 for relative movement in a vertical plane.

To facilitate surgical procedure in manipulating the air directing head in conjunction with the necessary surgical lighting used during an operation, a high intensity lamp 41 is suspended from the bracketry 38 in close proximity to the head 14. The lamp 41 is shown supported within a yoke-shaped member 42 which in turn is rotatably suspended from the bracket arm 40. A handle 44 is provided at the opposite end of the arm for the purpose of operating and positioning the lamp.

In keeping with another aspect of the invention, a humidification system is provided which supplies predetermined amounts of moisture to the air prior to its emission from the head so as to prevent the air from drying out a wound during long operations. In the illustrated embodiment, the humidification system includes an atomizer 46 that is located in the throat of the blower unit discharge tube 19 and adopted to spray sterile water into the air in a downstream direction. The spray mixes the air stream and is carried through the final filter 31 which insures its even distribution with the air prior to discharge from the head. Sterile water from a supply tank 48 is supplied to the atomizing unit 46 through a line 49 under pressure provided by an appropriate pump 50. The amount of water supplied to the atomizing unit, and thereby the amount of moisture added to the air, is controlled by a valve 51 operated by an electric solenoid 52.

In carrying out this aspect of the invention, means are provided for automatically maintaining the air velocity and humidity to preselected parameters regardless of changes in conditions that may occur during the course of an operation. Referring to FIG. 5, there is shown an illustrative diagrammatic circuit for controlling the air velocity of the system. To measure the actual velocity of the air discharged from the head 14, an air velocity sensor 55 is located within the head downstream of the final filter 31. The velocity sensor may be any well known type such as two matched thermistors operated in a self-heated mode and arranged in a bridge network supplied with a regulated constant voltage. Air passing over the sensor thermistors causes a bridge voltage unbalance that is directly proportional to the air velocity. This bridge unbalance is then detected by a control summing amplifier 56 and compared to a command velocity setting established by a dial 58. The difference between the bridge output and the command setting results in an error signal that is amplified by the summing amplifier 56 and then converted to a pulse train via appropriate electronic controls 59 including a 60 HZ line synchronizer. The output from the electronic controls 59 then drives the speed control for the fan 20, thus increasing or decreasing the air efflux from the head 14 to rebalance the system to the set velocity. Such a closed loop control system will work continuously and precisely, maintaining the output velocity to within plus or minus 5 f.p.m. of the desired velocity. For convenient access by members of the surgical team during an operation, the air velocity control dial 58 may be located on the head 14 as shown in FIG. 1.

A somewhat similar diagrammatic circuit for controlling the air humidity is shown in FIG. 6. In this case, a humidity control sensor 60 is positioned downstream of the final filter 31. The humidity sensor 60 may be a capacitive device that changes its impedance as a function of moisture vapor content. The output of the sensor thus may be a 60 HZ signal proportional to the relative humidity. This signal is rectified by a full wave bridge 61 and then by means of a summing amplifier 62 compared to a command humidity signal established by a control dial 63. The difference between the actual signal and the command signal again is the error voltage which is then amplified by the summing amplifier 62 and applied to drive circuitry 64 which controls the solenoid 52 for the atomizer valve 51, thus increasing or decreasing the moisture content and rebalancing the system to a desired set humidity. The humidity control dial 63 similarly may be located on the head 14 for easy access.

Referring now to FIGS. 7 and 8, there is shown an alternative form of surgical air directing apparatus 70 embodying the present invention. The apparatus 70 includes an air directing head or plenum 71 connected to a housing 72 through appropriate tubing 74. The housing 72 may serve as a manifold that is connected by flexible tubing (not shown) to a blower unit at some removed point, or alternatively, the housing could itself contain a blower.

The head 71 is pivotally mounted within a yoke-shaped bracket 75 which in turn is rotatably suspended from a depending bracket member 76. The bracket member 76 is mounted for sliding translation along a ceiling track 78 preferably located over an operating table or area. To facilitate easy manipulation and movement of the head 71, a handle 79 is provided about the forward side of the head.

The head 71, as in the embodiment of FIGS. 1–6, is adapted to emit a central laminar flow column of contaminant-free air surrounded by an annular sheath of high velocity contaminant-free air which prevents bacteria and other contaminants from entering the central column. To this end, a high efficiency particle air filter 80 is contained within the head 71 and an air straightening grid 81 is supported in the end of the head immediately downstream of the filter 80. The grid 81 has an outwardly tapered outer wall 82 held in closely spaced relation to an outwardly tapered lip 84 of the head 71 to define an annular air passageway 85. A perforated sheet 86 covers the entire top of the grid 81 and serves to restrict and reduce the flow of air through the grid, thereby lowering the velocity of air passing through the grid while causing air to be forced through the annular passage 85 at a substantial higher velocity. Since the outer grid surface 82 and the head lip 84 are tapered outwardly, the high velocity annular sheath of air in this case is directed in a downward and outward direction. It will be appreciated that since all of the air traveling through the head 71 must pass through the high efficiency filter 80 both the central column of air and the surrounding annular air sheath emitting from the head are substantially contaminant free.

Referring now to FIG. 9, there is shown an alternative form of an air directing head 90 which has an integral surgical lighting system. As in the embodiment of FIG. 8, the head 90 includes a high efficiency air particle filter 91 extending across its entire width and an air straightening grid 92 located centrally within the end of the head immediately downstream from the filter. In this case, in order that surgical lighting may be focused simultaneously with air emitted from the head, a plurality of lamps 94 are disposed about the periphery of the grid 92 within the end of the head 90.

To create a relatively high velocity outer air sheath, the lamps 94 are contained within a housing 95 formed with an inner wall 96 extending parallel to the panels of the grid 92 and an outer wall 98 extending in an outwardly flared manner so as to define an annular air passageway 99 with an outwardly tapered lip 100 of the head 90. Due to the outwardly tapered configuration of the wall 98, air traveling through the annular passageway 99 is constricted in a nozzling effect which increases its velocity over that of a central column of air passing through the straightening grid 92.

In view of the foregoing, it can be seen that the surgical air directing apparatus of the present invention is selectively positionable to provide a column of bacteria-free air to any desired operating area to effectively isolate that area from contaminants throughout surgical operations. The apparatus also permits a surgical team greater flexibility in positioning themselves about an operating table and enables them to easily control and maintain the air velocity and humidity to precise parameters.

I claim as my invention:

1. Apparatus for directing clean air to a patient zone comprising a movable air discharge head having outer walls defining an air passageway, a delivery tube connected at one end to said head, a blower unit connected to the other end of said delivery tube for causing a high pressure air flow through said tube and the air passageway of said head, first filter means for preliminary filtering and cleaning of said high pressure air flow prior to entry into said head air passageway, said head having a terminal outlet and means for directing and discharging said air flow from said terminal outlet into a central column or relatively low velocity laminar flow air, nozzle means associated with said head for channeling an outer peripheral portion of said air flow and accelerating the flow thereof to create an outer sheath of relatively high velocity air surrounding said central column, high efficiency filter means within said head substantially adjacent said terminal outlet, said high efficiency filter means being in direct engagement with and supported by the outer walls of said head and occupying an area completely across said air passageway for cleaning all of said air flowing through said head so that said central column and outer sheath both are substantially contaminant free, and said head being selectively positionable to permit direction of said contaminant free air column onto a selected operating area.

2. The apparatus of claim 1 including humidification means for selectively supplying water vapor to said air flow upstream of said head so that air discharged from said head has a determined humidity, and control means for automatically maintaining the humidity and velocity of air discharged from said head at a preselected values regardless of variations in the condition of air taken in at said blower unit.

3. The apparatus of claim 1 in which said head includes an outer housing which contains said filter means, and said nozzle means includes a frustoconical shaped hollow damper member mounted coaxially within said housing upstream of said filter means, said damper member and housing defining an outer annular air passageway extending the height of said damper member, said annular passageway having a greater cross sectional area at its upstream end than at its downstream end so that the velocity of air passing therethrough is increased, and said damper member defining a central passageway having a smaller cross sectional area at its upstream end than at its downstream so that the velocity of air passing therethrough is reduced.

4. The apparatus of claim 1 including a grid mounted in closely adjacent relation to said high efficiency filter means at the downstream end of said head for imparting a laminar flow to the central column of air discharged from said head.

5. The apparatus of claim 4 in which said blower unit has an outlet port and an inlet port, and said first filter means is disposed adjacent said blower inlet port.

6. The apparatus of claim 1 including bracket means for movably suspending said head from the ceiling of a room to permit positioning of said head so that said central air column may be directed to a desired operating area of said patient zone, said head being movable in a horizontal plane about a pivot point on said ceiling, and said head further being pivotably adjustable in a vertical plane at any position in said horizontal plane.

7. The apparatus of claim 6 including a lamp supported by said bracket means in close proximity to said head, said lamp being adjustable to direct light upon the same operating area that said head directs said central air column.

8. The apparatus of claim 1 in which a lamp means is mounted on said head to direct light in the same direction that said central air column is directed from said head.

9. The apparatus of claim 8 including an air straightening grid mounted in the downstream end of said head, said air straightening grid having an outer end surface located in closely spaced relation to said head to define an outer annular air passageway, and said grid being covered with a perforated sheet which retards the velocity of air flowing through said grid while permitting air to travel through said outer annular passageway at a relatively high velocity.

10. The apparatus of claim 1 including an air straightening grid mounted in the end of said head for imparting a laminar flow to said central air column as it discharges from said head, and lamp means mounted within said head at the periphery of said grid for directing light in the same direction that said central air column is directed.

11. The apparatus of claim 10 in which said lamp means is contained within a lamp housing, said lamp housing having a tapered wall in closely spaced relation to the interior of said head to define an outer annular air passageway having a smaller area at its downstream end than at its upstream end, whereby air traveling through said outer annular passageway is increased in velocity.

12. Apparatus for directing clean air to a patient zone comprising a movable air discharge head having outer walls defining an air passageway, delivery tube connected at one end to said head, a blower unit connected to the other end of said delivery tube for causing a pressurized air flow through said tube and the air passage of said head, said head having a terminal outlet and means for directing and discharging said air flow from said terminal outlet into a central column of relatively low velocity laminar flow air, high efficiency filter means within said head substantially adjacent said terminal outlet, said high efficiency filter means being in direct engagement with and supported by the outer walls of said head and occupying an area completely across said air passageway for cleaning said central column of air flow to be substantially contaminant free, nozzle means within said head immediately upstream of said filter means for channeling an outer peripheral portion of said air flow and accelerating the flow thereof to create an outer sheath of relatively high velocity air surrounding said central column, said nozzle means being effective to direct said air sheath through an outer peripheral portion of said high efficiency filter means so that said central column and outer sheath both are substantially contaminant free, and said head being selectively positionable to permit direction of said contaminant free air column onto a selected operating area.

13. The apparatus of claim 12 including a track for suspending said head from the ceiling of a room to permit lateral movement of said head along said ceiling.

* * * * *